Oct. 28, 1969　　　　　C. J. WEDLAKE　　　　　3,474,546
VISUAL ARTS MATCHING CHARTS
Filed May 22, 1967　　　　　　　　　　　　　2 Sheets-Sheet 1
FIG.1
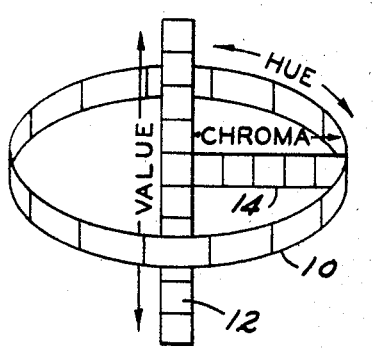
FIG.2
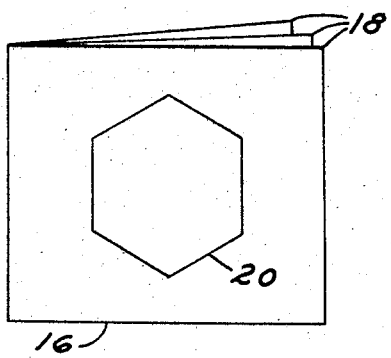
FIG.3　　YELLOW
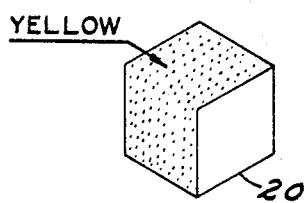
FIG.4　　CYAN
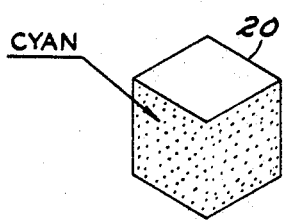
FIG.5　　MAGENTA
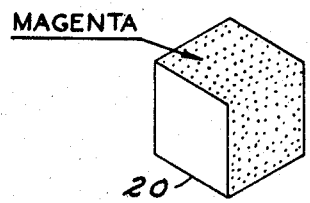
FIG.6
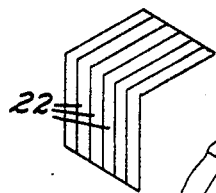
FIG.7
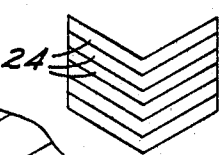
FIG.8
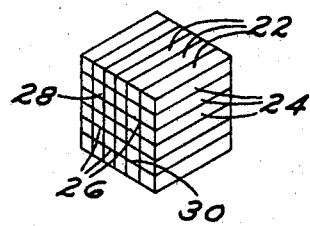
FIG.9
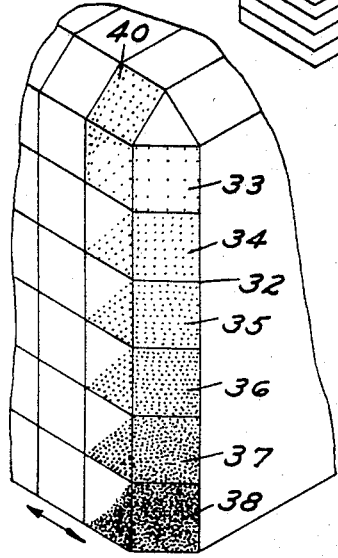
INVENTOR
CYRIL J. WEDLAKE
BY *Harley, Ginsten & Farley*
ATTORNEYS

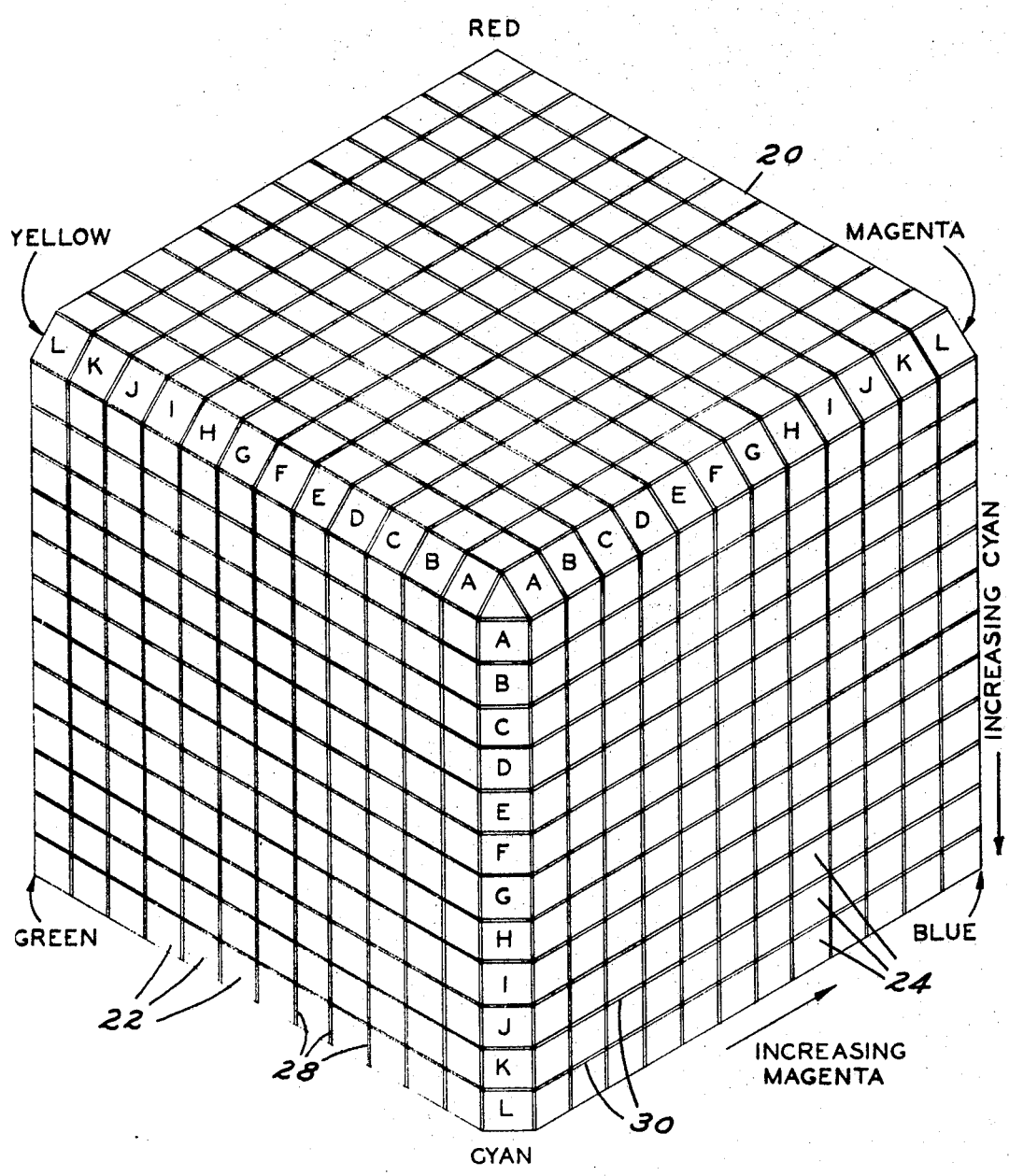

United States Patent Office 3,474,546
Patented Oct. 28, 1969

3,474,546
VISUAL ARTS MATCHING CHARTS
Cyril J. Wedlake, Berkley, Mich., assignor to The Veleron Corporation, a corporation of Michigan
Filed May 22, 1967, Ser. No. 640,257
Int. Cl. G09b 19/00
U.S. Cl. 35—28.3                                1 Claim

ABSTRACT OF THE DISCLOSURE

A three-faced axonometric cubical projection color chart display with subdivisions of discrete stepped color increments made up in any one face by the over-printing of progressively stepped saturation densities of two subtractive primary colors on a white background, successive similar color charts being printed on successive backgrounds having progressively stepped saturation densities of overall black undertones providing:

(1) A composite sequence of color charts having discrete subdivisions of unduplicated color gradations covering the entire perspective spectrum in sufficiently fine steps to render any intermediate gradations of substantially imperceptive difference.

(2) Complete coded color identification through the use of no more than three density specifications for any given single color (two subtractive primaries plus black).

(3) Rapid systematic color location and matching by selecting the closest color area on the first pure color (no black) chart and proceeding to the same area of successively darker background charts until the exact color is found, and (4) A system of exact printed color duplication through the use of standard printing dye and screen specifications.

Background of the invention

This invention relates to a color specification system in general and more particularly to a system of color matching charts which facilitate color location, matching, identification and duplication in the color printing field. Typical prior art color matching charts which attempt to present the entire spectrum of color gradations, including variations in hue, intensity of saturation or chroma, and darkness value, have failed to provide a convenient systematic presentation which would make it feasible to proceed directly to the location or matching of a desired color. Conventionally, three-color printing is used, in addition to gray undertone values, for many if not all of the intermediate colors which are displayed in a manner leading to many duplications as well as uncertainties of location. In addition, typical prior color matching charts lack a system of code identification together with specifications which would facilitate an exact duplication, as in commercial printing.

Summary of invention

The present color matching chart system is directed to overcome these prior limitations and deficiencies by minimizing the variables in identifying and producing specific colors having perceptive differences in hue, intensity of saturation, and darkness value; by eliminating color duplications; by standardizing and coding steps of saturation intensity for the primary colors and darkness values employed; and by systematic presentation of color gradations with respect to progressive steps of saturation intensity, ratio of primary colors, and darkness values, whereby a particular color may be matched or found, designated and exactly reproduced, as with conventional color printing techniques. In applying this system to printed color matching charts, three standardized subtractive primary color dyes are employed, (cyan, magenta and yellow) with standardized stepped screen densities coded as to each primary color and darkness value superimposed to produce each distinct identifiable color, no more than two primary colors being employed in producing any given color. This two color-three density approach renders the specification of any given color fixed, definite and invariable with only one possible combination of densities as distinguished from the conventional three color approach wherein an infinite variety of density combinations are possible to produce the same color. The elimination of the third color variable in producing any single given color is thus a key feature in standardizing the specification and duplication of such color.

The chart form employed is hexagonal in shape but appears to be an axonometric projection of a solid cube by the manner of subdivisions and coordinate reference provided. The center of the chart, the corner of the cube which appears to extend toward the viewer, is the figurative white or neutral color reference point. Progressively stepped screened prints of the subtractive primary colors are extended along three coordinate axes corresponding to the three visible edges of the cube from a minimum saturation intensity at the center to a solid subtractive primary reference at the far corners.

Within each of the equal diamond shaped faces of the cube figure is provided the color tints of the two color combination resulting in subdivided overprints of the subtractive primaries in saturation intensities corresponding to those along the coordinate axes. A solid green color patch at one intermediate outer corner is thus an overprint of the essentially solid yellow and cyan; a blue, that of cyan and magenta; and a red, the combination of magenta and yellow, thus providing spectral and subtractive primaries alternately at the six outer corners of the cube projection.

Value variations are provided by successive charts wherein a uniform printing of a selected screen density of black color dots is provided, for each entire chart figure, successive charts having progressively higher saturation intensities of black.

In perceptual context, the yellow dots produce a yellow filter over two-thirds of the hexagon and the cyan and magenta do likewise over respectively different but overlapping parts of the color chart. Where the yellow and cyan "filters" overlap, for example, varying tones of green are produced and since the magenta does not extend into this same area, there is no interference. However, where the magenta extends into the cyan and yellow areas, it screens out the green and leaves the blue and red tints, respectively.

Brief description of the drawing

The system of presenting and being able to exactly reproduce colors in accord with the teachings of this invention will best and more fully be understood in a reading of the following specification which has reference to the accompanying drawings.

FIGURE 1 is a graphic illustration of the tristimulus values commonly used in identifying color variations.

FIGURE 2 is a perspective layout of the chart or book form in which the successive color charts of this invention may be used.

FIGURES 3–5 are illustrations of the different major color areas of the color chart of this invention, as seen individually.

FIGURES 6 and 7 show the subdivisions for progressive saturation intensity or chroma used with the color sectors of FIGURES 3 and 4, respectively.

FIGURE 8 is a composite of the last two drawing figures to show the overprinted interrelation of different subdivided color sectors.

FIGURE 9 is a corner segment of an illustrative part of the color chart of this invention to show the use of progressive density screen-plate printing for chroma variation and the coordinate references in the proposed color chart.

FIGURE 10 is a full layout of one of the successive color charts of this invention.

Description of the preferred embodiments

The tristimulus characteristics of color are conventionally shown in a three-dimensional figure, as in the first drawing figure. Spectral hues or color variations are represented by a peripheral band 10. Light and dark values are shown on the vertical strip 12 through the center of band 10. The strength of saturation intensity of the colors, their chroma content, is shown by the radial strip 14.

Each of the spectral colors on the band 10 may vary in value depending upon the white or black content near the top and bottom of the vertical reference strip 12. Similarly, they may vary in saturation intensity chroma by their density as represented on the radial strip 14. In color printing, the latter is a matter of how sparse or dense the color dots are applied through screens on the printed page.

The color charts of this invention may be individual or provided in the book-form 16 shown in the second drawing figure. Each separate chart on a page 18 has the color gamut it presents shown within a hexagonal outline 20. As will later be discussed more fully, a given chart is for constant darkness value. That is, its black content is consistent for all of the color tints shown.

In FIGURES 3–5 the hexagonal outline, form 20 of the color chart is shown to have different segments identified with the prominent color used in such areas. The three subtractive primary colors of yellow, cyan, and magenta, which are used, each covers two-thirds of the hexagonal figure. This causes an overlap of different of the primary colors in half of the sector of an adjacent color and divides the chart into three diamond shaped segments each bearing a different two-color combination.

To provide variation in saturation intensity of chroma for each base color, from a common point of reference, the color segments are each subdivided into chevrons by lines parallel to the outer side edges of the part of the hexagonal figure within which disposed providing progressive steps of saturation intensity for such color. Those for the base yellow segment are shown in FIGURE 6 and identified as 22. In FIGURE 7 the base cyan segment is subdivided by the chevrons 24.

When the yellow and cyan segments are superimposed upon each other, with the chevron subdivisions provided for each, as shown in FIGURE 8, a multiple subdivision of each leg of the chevrons which overlap occurs. This produces a multiplicity of small diamond shaped areas 26 defined by intersecting subdivision lines 28 and 30.

The saturation intensity for each chevron band of a color group is increased outwardly from the common center reference point. This is accomplished by varying the density of the dots of color and consequently the amount of the white or light background that shows through, in each chevron progressively towards the solid colors at the outer limits.

In FIGURE 9 the progression of density for saturation intensity is shown in the fragmentary lower corner part of a color chart for the base color of cyan. However, before discussing this, certain details of the color chart arrangement which have not been mentioned should be described.

As first apparent in FIGURE 8 the base color subdivision of the hexagonal figure form 20 causes the figure to appear as an axonometric projection of a solid cube. The overlapping chevron subdivision further causes each figurative face of the cube to appear to the viewer as subdivided into smaller segments or parts. This is shown on the left face of the figurative cube in FIGURES 8 and 9 and in all faces in the last drawing figure.

The seemingly three dimensional figure form is particularly advantageous since, as mentioned at the outset, color relation has a three dimensional aspect. The interrelation of the different hues or colors is present and shown consecutively within the hexagonal form and the saturation intensity varies outwardly from the center. However, natural visual subdivisions of broadly red, green and blue areas are provided as on different faces of a cube. The red area is on top with the green and blue areas on the side faces.

To keep the visual impression of a three dimensional cube and provide a display for each of the individual subtractive primary colors, the inner disposed edges of the apparent cube are figuratively chamfered. This provides progressive saturation intensity color sequence strips 32 for the subtractive primary colors which are easily related to the subdivisions on each side thereof. It also provides coordinate references for identifying and specifying any of the different color combinations and tints. As shown in the last drawing figure, the different saturation intensities for the individual subtractive primary colors are identified as A through L outwardly from the center reference point as the saturation increases.

Returning now to FIGURE 9 the saturation intensity variation in a given sequence of chevron bands is obtained by the screen-plate printing process which enables varied density of color dot reproduction. For example, in the pure cyan strip 32, the color patch areas 33–38 are of increasingly densely reproduced dots until they cover the whole background and fill the color patch 38 with the solid color. This same variation is provided in each of the color areas. Consequently, in the part of the yellow strip shown in the drawing, the color area 40 is of like saturation intensity to that of area 33 in the cyan sequence.

In having a given density of given color dots for each of the chevrons, it follows that the overprinting of such as the yellow and cyan chevrons produces a two color area of a greater composite density, but of the same separate density. Consequently, it is as in the use of two filters and the color patch 42, for example, where the least dense yellow and cyan chevrons of the tone quality of color patches 33 and 40 overlap, is as with two mild filters of their given colors and a pale green color is produced.

In FIGURE 10 the color chart of this invention is shown in full detail, except for actual color.

The hexagonal form 20 of the chart is defined by the outer edges of the axonometric projection of the figurative cube. The different sequences of the subtractive primary colors are shown as the coordinate references with the terminal color area L of each being of the solid color. The normal primaries of green, blue and red are shown and identified at the alternate corners of the cube figure resulting from overprinting of solid color subtractive primaries.

Where chevrons of a given color and of decreasing density overlap chevrons of another color and of constant density, there is an increasing proportion of the other color towards its coordinate axis or reference. Thus, as the chevrons of magenta decrease in saturation intensity from L to A, the cyan content in the L chevron for cyan is of increasing proportion. Similarly, where the progressively less dense color dots of cyan in its chevron L through A overlap the L chevron for magenta, there is a proportionately stronger magenta influence.

The letter designations of reference, as an E cyan with a J magenta identifies the particular color at the intersection of such coordinates. The screen densities are now necessarily in exact mathematical intervals but preferably are chosen to follow the characteristic visual response of the human eye. This causes gradations to be smoother and avoids a sudden jump in color visual response near the 50% level when dot contact or separation creates a visual difference disproportionate to mathematical change in the area of dot coverage. The maximum deviations from true equal area step intervals, however, varies less than 4%.

Separate charts are used to show darkness value differences. The gradations are normally at 10% intervals so that as you leaf back through the color chart book, like identified colors are graded from clear to darker shades of the same hue.

Since constant values are shown by separate charts, it is a simple matter to underprint the whole hexagonal chart form with an under-tone density of black dots for the percentage required.

From the foregoing, it will be appreciated that a full range of colors can be provided with only three basic subtractive primary color dyes, plus black for value differences, and that a maximum of only two of the colors are employed instead of three, to reproduce any given color. The problems of selection, specification and reproduction are thus greatly simplified, and with standardization of dye and screen specification, provide a basis for exact color selection, matching, specification and duplication.

The optimum sought, and closely approached with twelve steps of saturation intensity and eight successive charts having increasing darkness values in approximately 10% increments from 0 to 70%, is to provide a complete range of colors with a minimum number of distinct color specifications yielding minimum visually perceptive steps with respect to hue, saturation and value—so that any intermediate omitted steps are substantially of visually imperceptive significance.

With the pure color first chart and seven successively stepped charts for adding darkness value, a selection of some 3,744 unduplicated colors are provided, presenting an extremely fine gradation for selection and reproduction, and more importantly, accessibility as to location and matching within seconds by the straightforward systematic procedure of visually locating the closest general color area on the first chart and referring to the same area of successive charts to find the exact color which may then be identified, specified and reproduced through a simple designation e.g. cyan F, yellow I, 30%.

Without further discussion, it will be appreciated that this invention may include certain variations and modifications without departing from the spirit and scope thereof. Although a specific embodiment of a chart form has been shown and described, this has been done for purposes of discussion and without intending to limit the invention unnecessarily. The color arrangement and variation may also differ in some regards.

The overall teaching is of a new and different way of presenting colors, particularly for screen-plate printing, for use in graphic arts, and of being able to select and reproduce the colors with reasonable certainty of exactness. Beyond this, the scope of the invention should not be restricted beyond which is specifically excluded by the language of the hereinafter appended claims.

I claim:

1. A color specification system comprising; a first color chart having three mutually contiguous areas of color hues on a white background, any two successive areas being adjacent, said areas being subdivided into smaller areas forming columns and rows, each of said smaller areas screen printed in a progressive series of varying hues, the hues of any two adjacent areas being superimposed printings of no more than two of the three subtractive primary colors, said variation in hues presenting virtually all visibly distinguishable variations in color, each hue being distinguished by a coded density specification of no more than two subtractive primary colors, indicia identifying each column and row, a series of charts having hues identical to those in the first chart and identifying indicia therefor, each of said hues on each of said series having added thereto a uniform darkness value progressively stepped on successive charts.

References Cited

UNITED STATES PATENTS

| | | | |
|---|---|---|---|
| 824,374 | 6/1906 | Munsell | 35—28.5 |
| 1,597,830 | 8/1926 | Rueger | 35—28.3 X |
| 2,128,676 | 8/1938 | Ives | 35—28.5 |
| 3,229,385 | 1/1966 | De Pauw | 35—28.3 |
| 3,314,167 | 4/1967 | Allgood | 35—28.3 |

EUGENE R. CAPOZIO, Primary Examiner

HARLAND S. SNOGQUIST, Assistant Examiner